United States Patent [19]

Andersen et al.

[11] Patent Number: 4,552,632

[45] Date of Patent: Nov. 12, 1985

[54] HYDROMETALLURGICAL METHOD OF EXTRACTION OF COPPER FROM SULPHIDE-CONTAINING MATERIAL

[75] Inventors: Einar Andersen; Gunnar H. Boe, both of Kr-sand, Norway

[73] Assignee: Elkem a/s, Oslo, Norway

[21] Appl. No.: 627,773

[22] Filed: Jul. 5, 1984

[30] Foreign Application Priority Data

Jul. 8, 1983 [NO] Norway .................................. 832496

[51] Int. Cl.$^4$ .............................................. C25C 1/12
[52] U.S. Cl. ..................................... 204/107; 423/24; 423/38; 423/46; 75/101 R; 75/101 BE; 75/114; 75/117
[58] Field of Search ............ 75/101 R, 101 BE, 114, 75/117; 423/38, 46, 24; 204/107

[56] References Cited

U.S. PATENT DOCUMENTS

| | | | |
|---|---|---|---|
| 3,736,238 | 5/1973 | Kruesi et al. ........................ | 204/107 |
| 3,901,776 | 8/1975 | Kruesi et al. ........................ | 204/107 |
| 4,288,304 | 9/1981 | De Marthe et al. ................... | 423/38 |
| 4,337,128 | 6/1982 | Haakonsen et al. ................... | 423/38 |

*Primary Examiner*—John Doll
*Assistant Examiner*—Robert L. Stoll
*Attorney, Agent, or Firm*—Lucas & Just

[57] ABSTRACT

Copper content in sulphide-containing materials such as ores or concentrates is extracted by leaching the material by means of a leaching solution containing iron (III) chloride and copper (II) chloride, the leaching process being regulated in order to keep the red-ox potential in the leach solution between 430 mV and 460 mV, whereby iron (III) chloride is reduced to iron (II) chloride while copper (II) chloride is kept in the bivalent state. The copper content in the ore or concentrate is thereby leached as copper (II) chloride. Copper (II) chloride is thereafter extracted from the pregnant leach solution by contacting the solution with an organic complex-ion forming extractant which extraction properties are dependent on the chloride concentration.

4 Claims, No Drawings

HYDROMETALLURGICAL METHOD OF EXTRACTION OF COPPER FROM SULPHIDE-CONTAINING MATERIAL

The present invention relates to a hydrometallurgical method for extraction of copper from sulphide containing material such as sulphide ores or concentrates. The sulphide containing material is first leached by means of a leach solution containing iron (III) chloride and copper (II) chloride whereby iron (III) chloride is reduced to iron (II) chloride while copper (II) chloride is kept in bivalent state. The copper content in the sulphide containing material is leached as copper (II) chloride and the sulphide is oxidized to elemental sulfur. The copper (II) chloride is extracted form the pregnant leach solution by means of an organic complex-ion forming extractant of the kind where the extraction is dependent on the chloride concentration. The method is particularaly useful in connection with an organic extractant produced by Imperial Chemical Industries (ICI) with identification number DS 5443. DS 5443 is a pyridine carboxylic ester extractant.

The known methods for producing high purity copper comprises electrolytic methodes where a plurality of intermediate steps are necessary to clean the leach solution for impurities. It has not been possible to extract high purity copper directly from the leach solution. One reason for this is that extractants have not been available to selectively extract copper chloride from leach solutions which also contains chlorides of other elements.

ICI has recently developed a new extractant which is an organic extractant forming complex-ions and which acts in chloride solutions. The extractant has been given the identification number DS 5443. It has shown that this extractant makes it possible to produce high purite copper without the necessety of refining electrolytic copper. In addition this extractant also makes it possible to separate copper and silver.

Unfortunately, to selectively extract copper chloride ions from a solution by means of the said extractant, it is essential that both copper and iron are present in the solution in bivalent state. The equilibrium between the organic phase and the water phase is controlled by the concentration of chloride ions in the water phase as the extraction takes place by high concentration of chloride ions. The inventors have now found that by controlling the red-ox potential in the leaching process a leach solution can be achieved where both copper chloride ions and iron chloride iones are in bivalent state.

Tests have shown that good results and high recovery can be achieved by controlling the leaching process so that the red-ox potential in the leach solution is between 430 mV and 460 mV, preferably about 455 mV, measured by standard Pt/calomel electrodes.

EXAMPLE

A sulphide concentrate was leached in an apparatus for continuous leaching. The concentrate contained:

| copper | 7.700% | lead | 6.500% |
|---|---|---|---|
| zinc | 21.400% | silver | 0.0228% |

This concentrate was leached in a two-step counter current leaching process by means of a leach solution containing iron (III) chloride. The retention time in each step was 2 hours and the temperature was kept on 102° C. The leaching apparatus had a capacity of 30 liter of leach solution pr. hour. Concentrate was added to keep the red-ox potential at 455 mV in the second leaching step. During a campaign of 30 hours 800 liter of pregnant leach solution were produced containing in gram/liter:

| Cutot | Cu+ | Fetot | Fe2+ | Zn | Pb | SO42− | HCl |
|---|---|---|---|---|---|---|---|
| 23,3 | 2,9 | 69 | 69 | 33,8 | 1,92 | 7,8 | 16,4 |

The lead content in the leach solution was reduced becasue of crystalization of lead chloride.

The leaching efficiency was as follows:

| copper | 89.1% | lead | 99.9% |
|---|---|---|---|
| zinc | 99.9% | silver | 95.0% |

The pregnant leach solution was transported to a liquid-liquid extraction facility where copper (II) chloride was extracted from the pregnant leach solution into an organic extraction phase by means of the extractant DS 5443. By this liquid-liquid extraction a very clean copper chloride solution which only contained minor impurities was obtained. The copper produced by electrolysis of this copper chloride solution was so clean that it meets the specifications for cathod quality copper as regards the content of arsen and silver. The contents of bismuth and lead in the copper were below the analytical limit. For ores or concentrates containing antimony, antimony has to be washed away before the electrolysis.

The extraction of copper chloride by means of the extractant DS 5443 was done with DS 5443 diluted in kerosene (Escaid 100). Escaid 100 is a petroleum based solvent supplied by Exxon Company and is a mixture of about 20% aromatic hydrocarbons and about 80% aliphatic hydrocarbons. The extraction is surprisingly selective and only CuCl2 is tranferred via the organic phase into the stripping solution. Anolyte from the electrolysis is used as stripping solution.

The electrolysis of the copper chloride solution which is obtained after stripping of the copper chloride from the organic phase, can be done in any known way. However, it is preferred to use a fluidized bed method. According to this method a bed of copper balls where the copper balls have a diameter of about 0.5–0.1 mm is fluidized by means of the copper chloride solution and electric current is conducted through the fluidized bed which then act as a cathode. The electrolytic copper will precipitate on the copper balls while chlorine is produced at the anode. The copper balls will grow to a diameter of 2.5–3 mm before they are transported out of the fluidized bed. This means that the weight of each copper ball is increased about 50 times. As the big balls are transported out of the system, small copper balls are transported into the system. The produced copper balls are compact and do not contain any chlorides.

Zinc chloride can eventually be extracted from the leach solution after extraction of the copper chloride. This extraction is done by tri-butyl-phosphate diluted in Solvesso 150. Solvesso 150 is a petroleum based solvent supplied by Exxon Company containing over 99% aromatic hydrocarbons and has a boiling point of 150° C. After stripping zinc chloride from the organic phase, zinc is produced in known way from the zinc chloride solution.

Silver is not extracted by the said extractants and can thus be cemented from the leach solution at any convenient step in the process. Thus the silver in the ore or concentrate is recovered.

The leach process has to be controlled so that the concentration of copper (II) chloride in the solution which is to be treated by the organic extraction phase is about 0.1–30 g/l, while the concentration of copper (I) chloride preferably is below 10 g/l and the concentration of iron (III) chloride preferably is below 20 g/l.

We claim:

1. A method for extraction of copper from sulphide ores or concentrates by leaching the ore or concentrates by means of iron (III) chloride and copper (II) chloride containing leach solution, characterized in that the leaching process is regulated in order to keep the red-ox potential between 430 mV and 460 mV whereby iron (III) chloride is reduced to iron (II) chloride while copper (II) chloride is kept in the bivalent state and the copper content in the ore or concentrate is leached as copper (II) chloride, whereafter the pregnant leach solution is contacted by a pyridine carboxylic ester extractant, said extractant being an organic complex-ion forming extractant of which the extraction properties are dependent on the chloride concentration whereby copper (II) chloride is extracted from the pregnant leach solution into the organic phase.

2. Method according to claim 1, characterized in that copper (II) chloride is stripped from the organic phase by means of a stripping solution containing 0.1–30 g/l of copper (II) chloride.

3. Method according to claim 1, characterized in that copper is recovered from the stripping solution by electro-winning whereafter the stripping solution is recycled to the stripping step.

4. Method according to claim 2, characterized in that copper is recovered from the stripping solution by electro-winning whereafter the stripping solution is recycled to the stripping step.

* * * * *